United States Patent
Beyer et al.

(10) Patent No.: US 8,807,486 B2
(45) Date of Patent: Aug. 19, 2014

(54) COMMUNICATION NETWORK FOR A RAILBORNE VEHICLE

(75) Inventors: Ralf Beyer, Moerendorf (DE); Werner Hager, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 116 days.

(21) Appl. No.: 13/581,149

(22) PCT Filed: Feb. 23, 2011

(86) PCT No.: PCT/EP2011/052686
§ 371 (c)(1),
(2), (4) Date: Aug. 24, 2012

(87) PCT Pub. No.: WO2011/104278
PCT Pub. Date: Sep. 1, 2011

(65) Prior Publication Data
US 2012/0318930 A1     Dec. 20, 2012

(30) Foreign Application Priority Data
Feb. 25, 2010   (DE) .......................... 10 2010 010 074

(51) Int. Cl.
*B61L 15/00*    (2006.01)
*H04L 12/40*    (2006.01)

(52) U.S. Cl.
CPC ....... *B61L 15/0036* (2013.01); *H04L 12/40182* (2013.01); *H04L 2012/40293* (2013.01)
USPC ....................................................... 246/166.1

(58) Field of Classification Search
CPC . B61L 15/00; B61L 15/0018; B61L 15/0036; B61L 15/0063; H04L 12/40182; H04L 2012/40293

USPC ........................................... 246/166.1, 167 R
See application file for complete search history.

(56) References Cited

U.S. PATENT DOCUMENTS

| 6,854,691 B2 | 2/2005 | Kraeling et al. |
| 7,577,668 B2 | 8/2009 | Sato et al. |

(Continued)

FOREIGN PATENT DOCUMENTS

| DE | 102010027283 | * | 1/2012 | .............. G06F 11/20 |
| EP | 1 422 833 A2 | | 5/2004 | |

(Continued)

OTHER PUBLICATIONS

Kirrmann, H., et al., "The IEC/IEEE Train Communication Network", IEEE Micro, Mar. 2001, pp. 81-92, vol. 21, No. 2, IEEE Computer Society Press, Los Alamitos, California, USA URL: http://www.dca.ufrn.br/~affonso/DCA_STR/trabalhos/rt-diversos/The%20IEC-IEEE%20train%20communication%20network.pdf.

*Primary Examiner* — Zachary Kuhfuss
(74) *Attorney, Agent, or Firm* — Laurence A. Greenberg; Werner H. Stemer; Ralph E. Locher

(57) ABSTRACT

A track-bound vehicle, in particular a railborne vehicle, has a plurality of rail cars and a communication network for transmitting data signals. The communication network has two lines which run through the rail cars of the vehicle. The vehicle is designed in such a way that in each case one of the lines runs in the cars in a first region, and the other of the lines runs in a second region which is spatially separate from the latter, in at least one of the cars the course of the respective one line changes from the first region into the second region, and the course of the respective other line changes from the second region into the first region. Network components for refreshing the data signals that are transmitted in the lines are provided in the first region.

13 Claims, 3 Drawing Sheets

(56) References Cited

U.S. PATENT DOCUMENTS

| | | |
|---|---|---|
| 2004/0103113 A1 | 5/2004 | Sato et al. |
| 2006/0146699 A1 | 7/2006 | Sept et al. |
| 2009/0050380 A1* | 2/2009 | Leignel et al. ............... 180/14.1 |
| 2010/0219682 A1* | 9/2010 | Homma et al. ................ 307/9.1 |
| 2013/0113278 A1* | 5/2013 | Karl et al. ..................... 307/9.1 |
| 2013/0138996 A1* | 5/2013 | Beyer et al. ................... 714/4.2 |

FOREIGN PATENT DOCUMENTS

| | | |
|---|---|---|
| EP | 1 662 453 A1 | 5/2006 |
| EP | 1 995 148 A1 | 11/2008 |
| RU | 2107393 C1 | 3/1998 |
| RU | 2312783 C2 | 12/2007 |
| WO | 03068579 A1 | 8/2003 |
| WO | 2009/000544 A1 | 12/2008 |

\* cited by examiner

COMMUNICATION NETWORK FOR A RAILBORNE VEHICLE

BACKGROUND OF THE INVENTION

Field of the Invention

The present invention relates to a railborne vehicle, particularly a rail vehicle having a plurality of cars and a communication network for transmitting data signals, which communication network comprises two lines which run through the cars of the vehicle.

Such a railborne vehicle in the form of a rail vehicle having a plurality of cars and an Ethernet-based communication network is known, for example, from the technical article "Informations—und Steuerungstechnik auf Schienenfahrzeugen; [Information and control technology on rail vehicles], Barbara Schmitz; elektronik industrie 8/9-2008, pages 20 to 22".

In general, communication networks according to the Ethernet technology are increasingly used in rail vehicles for transmitting data signals. The advantage of using such Ethernet-based communication networks consists especially in that corresponding communication networks are widely used in other fields of the technology and the components required for setting up the communication networks can therefore be obtained comparatively inexpensively. In addition, communication protocols and applications which have already been successful in other, possibly also safety-critical applications are also available for corresponding communication networks.

When communication networks are used in the field of railborne vehicles, various problems specific to this application generally occur. Thus, the fire protection guidelines applicable to the respective type of vehicle must be taken into consideration when laying cables of corresponding communication networks. Furthermore, in the case of railborne vehicles, line lengths can occur which exceed the maximum line length of 100 meters specified, for example, for communication networks with twisted-pair cables of category 5 (CAT5) according to the IEEE 802.3 Standard. Keeping in mind the greatest possible stability of the communication network, it is also desirable that the communication network manage with the lowest possible number of electronic devices in the form of active network components.

BRIEF SUMMARY OF THE INVENTION

The present invention is based on the object of specifying a railborne vehicle, particularly a rail vehicle, having a plurality of cars and a communication network for transmitting data signals, which comprises two lines running through the cars of the vehicle, which is particularly advantageous with regard to the construction of the communication network.

According to the invention, this object is achieved for a railborne vehicle, particularly a rail vehicle having a plurality of cars and a communication network for transmitting data signals, which communication network comprises two lines which run through the cars of the vehicle, in that, in the cars, in each case one of the lines runs in a first region and the other one of the lines runs in a second region which is spatially separate from the former, in at least one of the cars, the course of the respective one line changes from the first region into the second region and the course of the respective other line changes from the second region into the first region and network components for refreshing the data signals which are transmitted in the lines are provided in the first region.

According to the invention, the railborne vehicle is thus designed in such a manner that in the car, in each case one of the lines runs in a first region and the other one of the lines runs in a second region spatially separate from the former. This results in considerable advantages with regard to a required redundancy since disturbances, for instance in the case of a fire, of a technical defect or of an accident, as a rule, will only affect one of the two regions and thus a basic availability of the communication network is retained by means of the other line in each case.

Due to the fact that, furthermore, the course of the respective one line changes from the first region into the second region and the course of the respective other line changes from the second region into the first region in at least one of the cars, it is also advantageously provided for that network components for refreshing the data signals transmitted in the respective line are required only in one of the spatially separate regions, namely the first region. In this context, it is possible, due to the crossed course of the two lines that the refreshing of the data signals transmitted in the respective line takes place in the first region both for the one line and for the other line. This offers the advantage that in the second region, corresponding network components for refreshing the respective data signals can be omitted in the second region which simplifies planning and installation of the communication network considerably overall. Compared with an alternatively conceivable structure of the communication network in which network components for refreshing the transmitted data signals are provided both in the first and in the second region, corresponding network components are additionally saved, which considerably improves the insensitivity to disturbances, in particular with respect to failures of the power supply since the line running in each case in the second region manages without active components. A corresponding minimization of the active components thus lastly results in increased availability of the communication network.

The network components for refreshing the data signals transmitted in the lines can be designed in different ways. In this context, it is ultimately only of significance that the corresponding network component performs a refreshment or regeneration of the data signals transmitted, in such a manner that, in particular, an implementation of the length of lines required in the railborne vehicle is made possible.

Crossing of the two lines from the first into the second region and vice versa can take place in one of the cars, that is to say once, or in a plurality of the cars, i.e. several times in the context of the present invention. The decisive factor is here only that at least one corresponding crossing point is present and in the first region at least two network components are arranged in such a manner that, overall, both a refreshment of the data signals transmitted in one line and a refreshment of the data signals transmitted in the other line are effected.

The railborne vehicle according to the invention can be, for example, a rail vehicle of any type, i.e. for example, a rail car, a locomotive, a streetcar or urban rail link, a subway, a goods train, a group of non-motorized cars for passenger transportation or a combination of these. In addition, the railborne vehicle according to the invention can also be designed, for example, as a magnetic levitation train or rail-guided vehicle with rubber wheels.

The communication network of the rail vehicle according to the invention can be used, for example, for the purpose of door control, for controlling the air conditioning, transmitting announcements, reporting fire and/or for drive system control and brake control, the corresponding systems, as a rule, being connected only to one of the two lines of the communication network.

In principle the change of lines between the first region and the second region can take place at any point or at any points, respectively, of the vehicle. It is thus conceivable, for example, that a corresponding crossing point is provided in the region of the respective car center as seen in the longitudinal direction of the vehicle.

The vehicle according to the invention is preferably developed in such a manner that, on transition from at least one of the cars to at least one adjacent car, the course of the respective one line changes from the first region of the one car into the second region of the adjacent car, and the course of the respective other line changes from the second region of the one car to the first region of the adjacent car. This means that, within the individual cars, in each case one of the lines runs in the first region and the other one of the lines runs in the second region. Crossing of the lines thus takes place exclusively in the region of the transition between two adjacent cars. It should be pointed out that the formulation "at the transition from at least one of the cars to at least one adjacent car" should not be understood to mean that the crossing of the lines necessarily takes place in the region of a car transition allowing passengers to change into another car. Instead, this formulation also comprises, in particular, the case where crossing of the lines is provided at the end of the respective car. The essential factor is here only that in the adjacent car itself, the lines run in each case in the other region.

According to another, particularly preferred development, the railborne vehicle according to the invention is designed in such a manner that, at each transition from one of the cars to an adjacent car of the vehicle, the course of the respective one line changes from the first region into the second region and the course of the respective other line changes from the second region into the first region, and in the first region of each of the cars of the vehicle, in each case at least one network component for refreshing the data signals transmitted in the respective line is provided. This means that the two lines run in each case in different regions in adjacent cars, i.e. that at each transition from one car to an adjacent car, there is a corresponding crossing point. Due to the fact that, in the first region of each car of the vehicle, in each case at least one network component for refreshing the data signals transmitted in the respective line is provided, each one of the two lines in each second car thus has at least one corresponding network component which ensures that inadmissibly long lengths of the lines or, respectively, disturbances in or distortions of the transmitted data signals caused by corresponding line lengths are reliably avoided.

According to another particularly preferred embodiment, the railborne vehicle according to the invention is designed in such a manner that the first region and the second region are in each case designed as separate fire sections in the cars. This is advantageous since, thus, a particularly reliable fire protection is made possible with regard to the communication network. If a public-address system which is linked to one of the two lines then fails, for example due to a fire, designing the first region and the second region as separate fire sections ensures with high reliability that systems connected to the lines running in the respective other region are still operable at least for a minimum period to be guaranteed.

In principle, the first region and the second region in the cars of the vehicle can be selected in each case in accordance with the respective requirements and boundary conditions. It is thus conceivable, for example, that the regions are arranged on different sides of the cars or at different heights within the cars.

In accordance with a further particularly preferred embodiment of the railborne vehicle according to the invention, the first region is an internal region of the roof of the respective car and the second region is an underfloor region of the respective car. This is advantageous since the internal region of the roof and the underfloor region of the cars are separated from the internal passenger space so that, on the one hand, damage to the lines is avoided, and, on the other hand, a required separation exists also for fire protection reasons. Due to the fact that in the second region, i.e. in the underfloor region of the respective car, an arrangement of network components is advantageously not required, the advantage is additionally provided that no facilities for power supply are required here which, as a rule, would have to be arranged in the interior of the vehicle, which would result in corresponding disadvantages with respect to fire protection.

The communication network can be basically a communication network of any technology known per se. This includes communication networks of different topologies and different technology, both with regard to the hardware and with regard to the protocols used.

According to a further, particularly preferred development of the railborne vehicle according to the invention, the communication network is a communication network in accordance with Ethernet technology. In accordance with the introductory explanations, this provides the advantage that the Ethernet is a fundamental, widely used technology for transmitting data signals. In addition, industrial embodiments of the Ethernet (Industrial Ethernet) are known, for example in the form of the so-called PROFINET, which are already adapted to the high availability and safety requirements of the industrial environment.

The communication network of the railborne vehicle according to the invention can be, according to a further, particularly preferred embodiment, a component of a multi-vehicle train bus. In this arrangement, a corresponding train bus is used for transmitting information between the vehicles of a train. A corresponding train can be, for example, a multiunit train consisting of a plurality of rail cars.

According to a further, particularly preferred embodiment, the railborne vehicle according to the invention is designed in such a manner that the two lines of the communication network are in each case linked at the ends of the vehicle to a network element used for linking the communication network to another vehicle. This advantageously provides for a particularly simple connection of the communication networks of different railborne vehicles to a train bus.

According to a further, particularly preferred embodiment, the railborne vehicle according to the invention is designed in such a manner that the communication network is a vehicle bus. In this context, a vehicle bus is understood to be a bus system of the type used for communication or, respectively, data transmission within a vehicle not separated in normal operation.

The railborne vehicle according to the invention can preferably also be developed in such a manner that the two lines of the communication network are interconnected to form a ring structure. This offers the advantage that this ensures a redundancy within the communication network to the extent that a single error does not completely bring down an exchange of data and/or the transmission of data signals via the communication network.

The railborne vehicle according to the invention can also be developed preferably in such a manner that the vehicle has at least one further communication network which is interconnected with the communication network. If the communication network is, for example, a vehicle bus, the further communication network can be designed, for example, as part of a train bus. In this context, both the communication network and the further communication network can have advantageously in each case two lines which run in each case in the first region and/or in the second region, respectively, and are crossed in the manner previously described in such a manner that network components for refreshing the data signals transmitted in the respective lines are in each case required exclusively in the first region.

The network components for refreshing the transmitted data signals can be basically arbitrary network components known as such per se in each case.

According to a further, particularly preferred embodiment of the railborne vehicle, the network components for refreshing the transmitted data signals are designed as repeater, switch, hub, bridge or router. This is advantageous since said network components are, particularly in the area of the Ethernet-based communication network, widely used, tried, and tested, and comparatively inexpensive network components which usually contain a functionality to the extent that they refresh or regenerate, respectively, the data signals transmitted in the respective line. A corresponding refreshment of the data signals can include, for example, the reception of a data signal, its conditioning and retransmission, possibly in amplified form. This advantageously removes noise and distortions in the propagation time and the pulse shape.

In the text which follows, the invention will be explained in greater detail with reference to exemplary embodiments, for which purpose

DESCRIPTION OF THE INVENTION

In the figures, the same reference symbols are in each case used for identical or essentially identically acting components.

Figure 1:
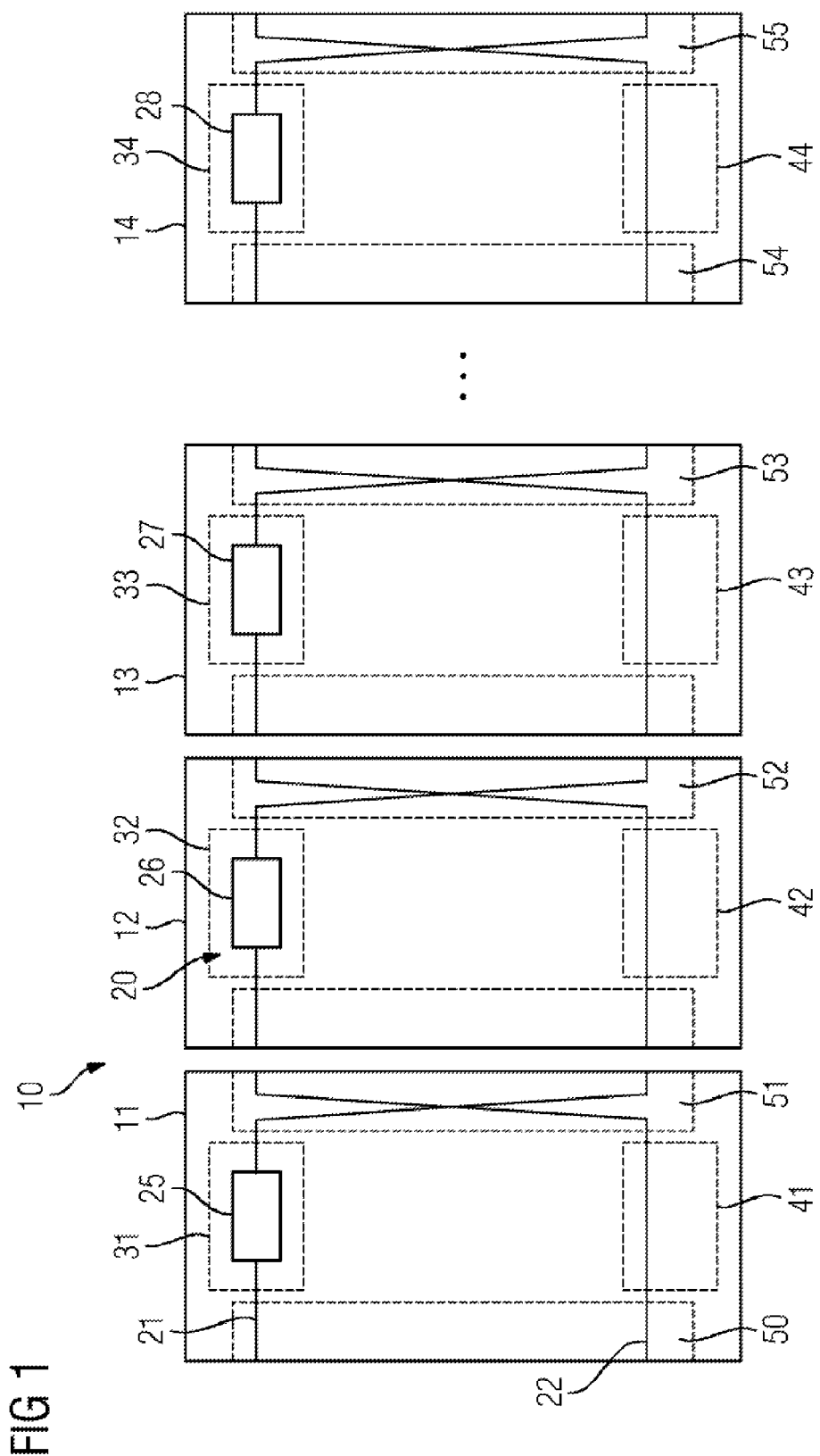
FIG. 1 shows in a diagrammatic drawing a first exemplary embodiment of the railborne vehicle according to the invention.

FIG. 1 shows in a diagrammatic drawing a first exemplary embodiment of the railborne vehicle according to the invention. It shows a railborne vehicle 10 which can be, for example, a railborne rail car which has cars 11, 12, 13 and 14. In addition, a communication network 20 is provided in the railborne vehicle 10, which network comprises two lines 21, 22 running through the cars 11, 12, 13, 14 of the vehicle 10 and is used for transmitting data signals. Corresponding data signals can be, for example, control information items for controlling the doors of the cars 11, 12, 13, 14, for controlling the brakes, for controlling the drive system, for controlling the airconditioning system or else for controlling loudspeaker systems and display units. For this purpose, corresponding devices are in each case linked to one of the two lines 21, 22 of the communication network 20.

In accordance with the representation in FIG. 1, the lines 21, 22 in cars 11, 12, 13, 14 in each case run in a first region 31, 32, 33, 34 and, respectively, in a second region 41, 42, 43, 44. The regions 31, 32, 33, 34, 41, 42, 43, 44 in this arrangement are in each case advantageously designed as separate fire sections in cars 11, 12, 13, 14. This means that lines 21, 22 run spatially separately from one another in those regions which, in the case of a fire in the railborne vehicle 10 or, respectively, in one of its cars 11, 12, 13, 14, meet certain requirements with regard to preventing the fire from spreading.

According to the representation in FIG. 1, the railborne vehicle 10 or, more precisely, its communication network 20 is distinguished in that, at each transition from one of the cars 11, 12, 13, 14 to an adjacent car 12, 13, 14, the course of the respective one line 21 or, respectively, 22, changes from the first region 31, 32, 33, 34 into the second region 41, 42, 43, 44 of the adjacent car 12, 13, 14 and conversely the course of the respective other line 22 or 21, respectively, changes from the second region 41, 42, 43, 44 into the respective first region 31, 32, 33, 34 of the adjacent car. This means that in each case crossing points are provided between car 11, 12, 13, 14, at which points lines 21, 22 in each case change from the first region 31, 32, 33, 34 into the second region 41, 42, 43, 44 or, respectively, from the second region 41, 42, 43, 44 into the first region 31, 32, 33, 34.

In the first regions 31, 32, 33, 34 respectively at, or respectively in the line 21 or, respectively, 22, running in the first region 31, 32, 33, 34 in each case, network components 25, 26, 27, 28 for refreshing the data signals transmitted in the respective line 21 or, respectively, 22, are provided. Corresponding network components 25, 26, 27, 28 advantageously enable, in particular, a length of line 21 or, respectively, 22 which allows the lines 21, 22 to extend along the longitudinal axis of the vehicle 10 over all cars 11, 12, 13, 14 of the vehicle. In this arrangement, the network components 25, 26, 27, 28 can be designed, for example as repeater or switch.

In the context of the exemplary embodiments described it shall be assumed that the communication network 20 is a communication network in accordance with Ethernet technology. Depending on the cables used for transmitting the data or data signals, respectively, only cable lengths of up to a maximum of 100 meters are usually supported in this arrangement. The network components 25, 26, 27, 28 thus advantageously enable the communication network 20 or, respectively, its lines 21, 22, to extend also over those vehicles 10 which exceed this maximum permissible length.

In the context of the exemplary embodiments described, the first region 31, 32, 33, 34 is in each case the internal region of the roof of the respective car 11, 12, 13, 14. This is advantageous since installation space for running cables is usually available here which, as a rule, is already designed as a separate fire section. The second region 41, 42, 43, 44 can be advantageously arranged or designed, respectively, in the underfloor region of the respective car 11, 12, 13, 14. The corresponding region is also usually already designed as a separate fire section or, respectively, can be designed as corresponding fire section with comparatively little expenditure due to the existing separation from the internal passenger space.

The crossing, recognizable in FIG. 1, of lines 21, 22 thus achieves the advantage, particularly from the point of view of installation, that no network components for refreshing the data or data signals transmitted via lines 21, 22 are required in the second region 41, 42, 43, 44 independently of the length of lines 21, 22. Instead, the network components 25, 26, 27. 28 for signal refreshment can all be arranged in the first region 31, 32, 33, 34, signal refreshment or signal amplification still however being possible with respect to the data signals transmitted via both lines 21, 22. This results in considerable advantages with regard to planning and implementation of the vehicle 10. In addition, only one network component 25, 26, 27, 28 for refreshing the data signals transmitted via lines 21, 22 is advantageously required for each of cars 11, 12, 13, 14, so that, overall, compared with a structure in which lines 21, 22 are in each case guided without crossing points in the first region 31, 32, 33, 34 or, respectively, in the second region 41, 42, 43, 44 and in each case a network component for refreshing the data signals transmitted via the respective line 21 or 22, respectively, is provided in both regions in each of cars 11, 12, 13, 14, a reduction in the active components of the communication network 20 is obtained.

In accordance with the representation in FIG. 1, an arbitrary number of cars can be advantageously supplied with lines 21, 22 of the communication network 20 in the manner shown. In this arrangement, further fire sections 50, 51, 52, 53, 54, 55, at which the crossing points of lines 21, 22 are located, are in each case advantageously provided at the ends of cars 11, 12, 13, 14 in accordance with the representation in FIG. 1. It is thus conceivable, for example, that the lines 21, 22 in each case run laterally in the area of the actual car transitions and in each case are continued in the other region after completed transition to the adjacent car.

Depending on the respective requirements and boundary conditions, different embodiments can be implemented on the basis of the basic principle of the railborne vehicle or its communication network, respectively, shown in the diagrammatic representation of the exemplary embodiment of FIG. 1, two examples of which embodiments will be explained in conjunction with FIGS. 2 and 3 in the text which follows.

Figure 2:
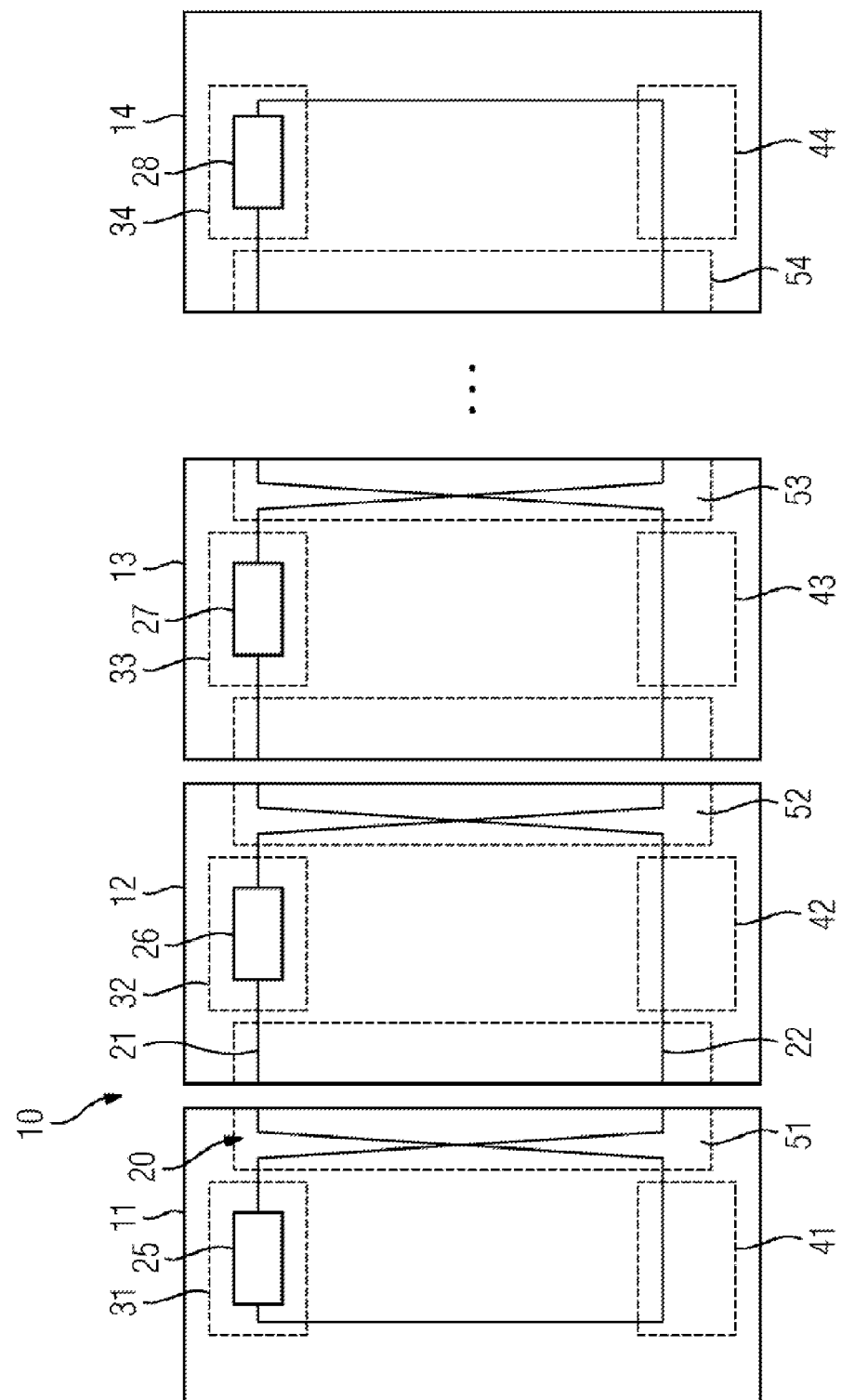
FIG. 2 shows in a diagrammatic drawing a second exemplary embodiment of the railborne vehicle according to the invention.

FIG. 2 shows in a diagrammatic drawing a second exemplary embodiment of the railborne vehicle according to the invention, the diagrammatic representation of FIG. 2 essentially corresponding to that of FIG. 1.

The communication network 20 according to the exemplary embodiment of FIG. 2 is a communication network in the form of a vehicle bus which can be, for example, a so-called "Consist network" according to the IEC 61375-1 Standard. According to the representation of FIG. 2, lines 21, 22 of the communication network 20 are here interconnected to form a ring structure which advantageously provides for redundancy and, in association therewith, a reduction in susceptibility to faults in the communication network 20.

Moreover, the structure of the communication network 20 of FIG. 2 essentially corresponds to that of the exemplary embodiment shown in FIG. 1 so that reference is made to the corresponding previous statements in this respect.

FIG. 3 shows in a diagrammatic drawing a third exemplary embodiment of the railborne vehicle according to the invention, the representation of FIG. 3 again corresponding to that of FIGS. 1 and 2 in its diagrammatic type.

Figure 3:
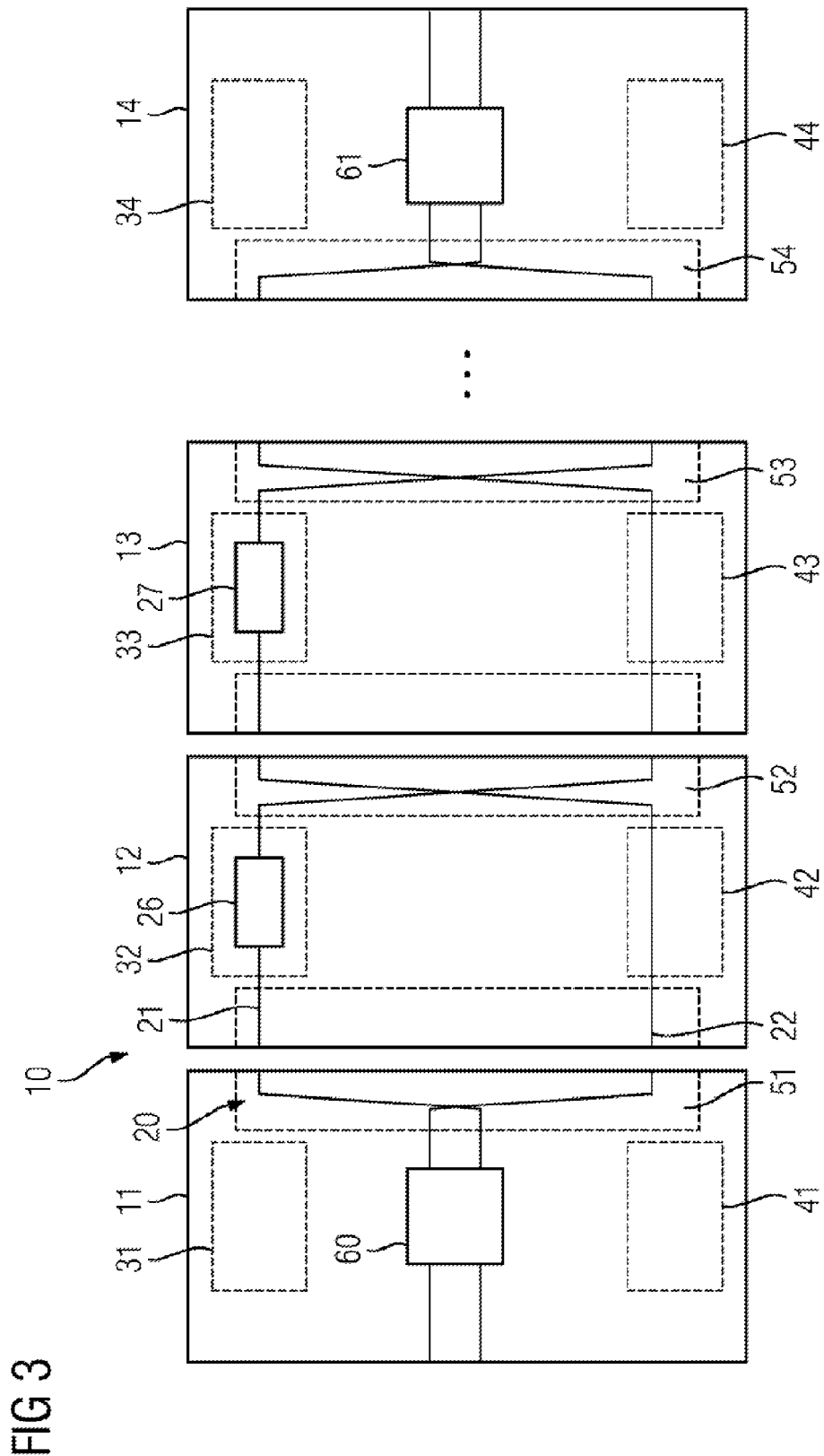
FIG. 3 shows in a diagrammatic drawing a third exemplary embodiment of the railborne vehicle according to the invention.

The communication network 20 according to the exemplary embodiment of FIG. 3 is then a communication network which is a component of a multi-vehicle train bus. Such a train bus can be, for example, a "train backbone network" according to the IEC 61375-1 Standard.

The two lines 21, 22 of the communication network 20 are linked in each case to a network element 60, 61 used for linking the communication network 20 to another vehicle at the ends of vehicle 10. In this arrangement, the network elements 60, 61 can be designed, for example, as routers and possibly arranged in one of the fire protection regions formed by regions 31 and 41 and, respectively, 34 and 44. The network elements 60, 61 enable the communication network 20 of vehicle 10 to be linked to the communication network of a further vehicle and thus to create a multi-vehicle train bus.

It should be pointed out that in a railborne vehicle, particularly a rail vehicle, there can be advantageously both a vehicle bus according to the network structure of FIG. 2 and a train bus according to the network structure of FIG. 3. In this case, both communication networks, which can be interconnected to one another, are advantageously in each case designed separately according to the exemplary embodiments of FIG. 2 or FIG. 3, respectively, in such a manner that crossing points for respective lines 21, 22 are provided in each case between cars 11, 12, 13, 14.

In accordance with the above statements, the exemplary embodiments described of the rail vehicle according to the invention have, in particular, the advantage that the fire sections are maintained within the vehicle 20 with respect to lines 21, 22 of the communication network 20. At the same time, advantageously, no active signal refreshment or signal amplification, respectively, is required in the second region 41, 42, 43, 44 of cars 11, 12, 13, 14 so that a particularly simple cable layout is possible independently of other conditions in this case. This includes the fact that, for example, advantageously, no power supply is required for active network components in the second region 41, 42, 43, 44.

In addition, the structure or topology, respectively, of the communication network 20 of the railborne vehicle 10 is advantageously based on a minimum or, respectively, comparatively small number of signal-processing or signal-amplifying assemblies, i.e. network components 25, 26, 27, 28. In this context, vehicle 10 has the advantage that the communication network 20 is comparatively insensitive to faults with respect to the failure of the power supply in one of cars 11, 12, 13, 14 of vehicle 10, since one of the lines 21, 22 manages without active components in each car 11, 12, 13, 14. In addition, the comparatively small number of required active components results in an increase in the availability of the communication network 20.

It must furthermore be noted that the railborne vehicle 10 can be advantageously implemented with cars 11, 12, 13, 14 constructed mechanically and electrically identically, which results in advantages with regard to costs and expenditure in production and operation of the vehicle 10.

The invention claimed is:

1. A track-bound vehicle, comprising:
   a plurality of cars each having a first region and a second region spatially separate from said first region;
   a communication network for transmitting data signals, said communication network having two lines running through said cars of the vehicle;
   one of said two lines running in said first region of said cars and the other of said two lines running in said second region of said cars;
   in at least one of said cars, a course of the respective said one line changing from said first region into said second region and a course of the respective said other line changing from said second region into said first region; and
   network components for refreshing the data signals being transmitted in said lines disposed in said first region.

2. The vehicle according to claim 1, wherein the vehicle is a railborne vehicle and the cars are rail cars.

3. The vehicle according to claim 1, wherein, on transition from at least one of said cars to an adjacent car, the course of the respective one line changes from the first region of said one car into the second region of the adjacent car and the course of the respective other line changes from the second region of said one car to the first region of the adjacent car.

4. The vehicle according to claim 1, wherein:
   at each transition from one of said cars to one of the adjacent cars of the vehicle, the course of the respective one line changes from the first region into the second region and the course of the respective other line changes from the second region into the first region; and in the first region of each of said cars of the vehicle, in each case at least one network component for refreshing the data signals transmitted in the respective line is provided.

5. The vehicle according to claim 1, wherein said first region and said second region are in each case designed as separate fire sections in said cars.

6. The vehicle according to claim 1, wherein said first region is an internal region of the roof of the respective car and the second region is an underfloor region of the respective car.

7. The vehicle according to claim 1, wherein the communication network is an Ethernet communication network.

8. The vehicle according to claim 1, wherein the communication network is a component of a multi-vehicle train bus.

9. The vehicle according to claim 8, wherein said two lines of the communication network are in each case linked at the ends of the vehicle to a network element used for linking the communication network to another vehicle.

10. The vehicle according to claim 1, wherein said communication network is a vehicle bus.

11. The vehicle according to claim 1, wherein said two lines of said communication network are interconnected to form a ring structure.

12. The vehicle according to claim 1, wherein said vehicle has at least one further communication network which is interconnected with said communication network.

13. The vehicle according to claim 1, wherein said network components for refreshing the transmitted data signals are selected from the group consisting of a repeater, a switch, a hub, a bridge, and a router.

\* \* \* \* \*